United States Patent
Ikai et al.

(10) Patent No.: US 8,203,801 B2
(45) Date of Patent: Jun. 19, 2012

(54) SYSTEM FOR ADJUSTING THE PRESSURE OF A HEAD ON AN INFORMATION STORAGE MEDIUM OF A DISK DEVICE

(75) Inventors: Yoshiaki Ikai, Kawasaki (JP); Takahiro Imamura, Ome (JP); Yoshitaka Suzuki, Fussa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 15 days.

(21) Appl. No.: 12/770,526

(22) Filed: Apr. 29, 2010

(65) Prior Publication Data
US 2010/0238583 A1 Sep. 23, 2010

Related U.S. Application Data

(63) Continuation of application No. PCT/JP2007/071376, filed on Nov. 2, 2007.

(51) Int. Cl.
G11B 5/60 (2006.01)
G11B 21/21 (2006.01)
(52) U.S. Cl. ......................................................... 360/75
(58) Field of Classification Search .................... None
See application file for complete search history.

(56) References Cited

U.S. PATENT DOCUMENTS

| | | | | |
|---|---|---|---|---|
| 5,130,867 A | * | 7/1992 | Ohashi | 360/75 |
| 5,305,165 A | * | 4/1994 | Brezoczky et al. | 360/246.2 |
| 5,416,656 A | * | 5/1995 | Fukuda et al. | 360/235.4 |
| 5,835,305 A | * | 11/1998 | Hamaguchi et al. | 360/234.1 |
| 7,239,471 B2 | | 7/2007 | Tanabe | |
| 2006/0179927 A1 | * | 8/2006 | Mate et al. | 73/105 |
| 2010/0157456 A1 | * | 6/2010 | Imamura et al. | 360/31 |

FOREIGN PATENT DOCUMENTS

| | | |
|---|---|---|
| JP | 01-224983 | 9/1989 |
| JP | 03-012801 | 1/1991 |
| JP | 03-012801 A | 1/1991 |
| JP | 04-034781 | 2/1992 |
| JP | 05-182102 | 7/1993 |
| JP | 08-007511 | 1/1996 |

(Continued)

OTHER PUBLICATIONS

International Search Report for International Application No. PCT/JP2007/071376 dated Feb. 5, 2008.

(Continued)

*Primary Examiner* — K. Wong
*Assistant Examiner* — James L Habermehl
(74) *Attorney, Agent, or Firm* — Knobbe, Martens, Olson & Bear, LLP (57) ABSTRACT

According to one embodiment, a disk device rotates a disk information storage medium to record and reproduce information on the information storage medium by use of a head that slides in contact with a lubricant coated on the information storage medium, wherein a sliding speed U, area A and normal force N are set to cause U×A/N to fall within a monotonously increasing region in which a coefficient of friction associated with a frictional force occurring in a contact area of the head that faces the information storage medium monotonously increases as U×A/N increases, where the sliding speed U represents a sliding speed at a sliding time of the head, the area A represents the contact area of the head, and the normal force N represents a normal force applied to the contact area of the head.

4 Claims, 8 Drawing Sheets

FOREIGN PATENT DOCUMENTS

| | | |
|---|---|---|
| JP | 2000-149478 | 5/2000 |
| JP | 2000-149478 A | 5/2000 |
| JP | 2002-245742 | 8/2002 |
| JP | 2006-190374 | 7/2006 |

OTHER PUBLICATIONS

Concise explanations of relevance, JP 01-224983, JP 05-182102, JP 03-012801, JP 08-7511 and JP 04-034781, Jul. 6, 2010.

An English translation of International Preliminary Report on, Patentability in the corresponding PCT application No. PCT/JP 2007/071376, Jun. 10, 2010.

Office Action for JP Patent Application No. 2009-538895.

* cited by examiner

SYSTEM FOR ADJUSTING THE PRESSURE OF A HEAD ON AN INFORMATION STORAGE MEDIUM OF A DISK DEVICE

CROSS-REFERENCE TO RELATED APPLICATIONS

This is a Continuation Application of PCT Application No. PCT/JP2007/071376, filed Nov. 2, 2007, which was published under PCT Article 21(2) in Japanese.

FIELD

Embodiments described herein relate generally to a disk device that rotates a disk-form information storage medium to record and reproduce (access) information with respect to the information storage medium by use of a contact-type head that slides in contact with a lubricant coated on the surface of the information storage medium.

BACKGROUND

Recently, techniques associated with devices contained in computers and peripheral devices externally connected to the computers are rapidly developed with the development of the computer technology. As one of the above techniques, a disk device comprising a disk-form information storage medium such as a magnetic disk and having a function of recording information by writing information to the information storage medium and a function of reading information from the information storage medium to which the information is written to reproduce the information is known. Most of the above disk devices comprise head sliders including recording/reproducing portions (heads) that record and reproduce information (access information) with respect to information storage media. The head is positioned close to the surface of the information storage medium to record information in each storage area (track) on the information storage medium and reproduce information from each track by arranging the head slider close to the surface of the information storage medium while rotating the information storage medium.

With the rapid development of the computer technology, it becomes strongly required to develop a device comprising an information storage medium having higher recording density and the recording densities of information storage media put on the market yearly increase. Generally, as the recording density of the information storage medium becomes higher, it becomes necessary to set smaller the gap between the surface of the information storage medium and the head and it is further required to keep the gap constant in order to correctly record and reproduce information.

Recently, a disk device utilizing a contact slider system that slides a head while it is kept in contact with the surface of a rotating information storage medium to record and reproduce information is studied (for example, see Jpn. Pat. Appln. KOKAI Publication No. H03-012801, Jpn. Pat. Appln. KOKAI Publication No. H08-7511, and Jpn. Pat. Appln. KOKAI Publication No. H04-034781). The disk device utilizing the above system is considered as a disk device that has high capability of writing and reading information and is suitable for an information storage medium with high recording density since the head is not separated from the surface of the information storage medium.

However, in the disk device in which the head and the information storage medium are set in direct contact with each other as in the above Jpn. Pat. Appln. KOKAI Publications, the head is rubbed on the information storage medium that rotates at high speed and tends to be worn away and there occurs a problem that the recording/reproducing capability is reduced.

DETAILED DESCRIPTION

In general, according to one embodiment, a disk device rotates a disk information storage medium to record and reproduce information with respect to the information storage medium by use of a head that slides in contact with a lubricant coated on the information storage medium, wherein a sliding speed U, area A and normal force N are set to cause U×A/N to belong to a monotonously increasing region in which a coefficient of friction associated with a frictional force occurring in a contact area of the head that faces the information storage medium monotonously increases as U×A/N increases, the sliding speed U represents a sliding speed at a sliding time of the head, the area A represents the contact area of the head, and the normal force N represents a normal force applied to the contact area of the head.

Figure 1:
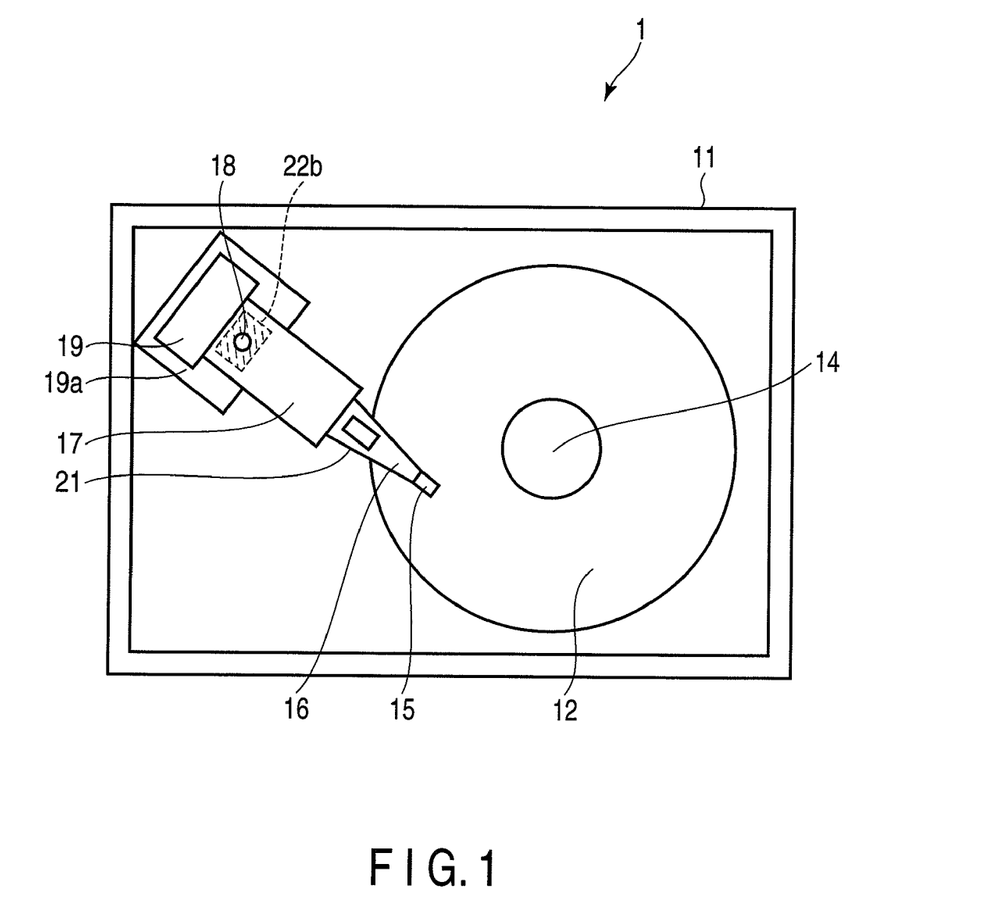
FIG. 1 is an exemplary view showing a hard disk drive (HDD) according to one embodiment of a disk device as viewed from above.
Figure 2:
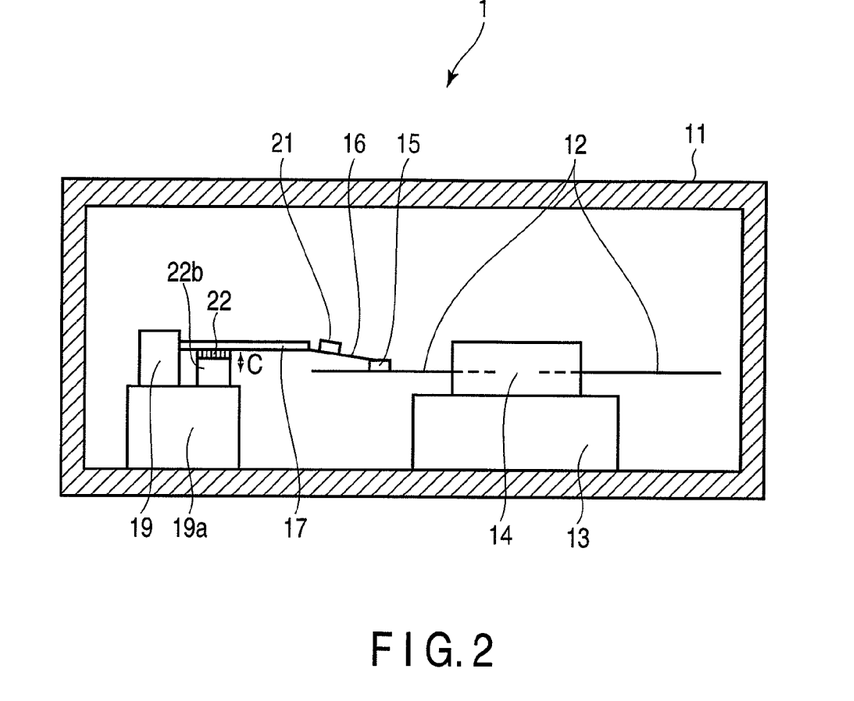
FIG. 2 is an exemplary view showing the hard disk device (HDD) of FIG. 1 as viewed from the side.

FIG. 1 is an exemplary view showing a hard disk device (HDD) according to one embodiment of a disk device as viewed from above. FIG. 2 is an exemplary view showing the hard disk device (HDD) as viewed from the side.

In the hard disk device (HDD) 1 shown in the above drawings, a magnetic disk 12 having a penetration hole formed in a central portion is provided in a housing 11 and recording of information onto the magnetic disk 12 and reproduction of information recorded on the magnetic disk 12 are performed in the HDD 1. The magnetic disk 12 corresponds to one example of an information storage medium. As shown in FIG. 2, the peripheral portion of the penetration hole of the magnetic disk 12 is sandwiched by a fixing member 14 in a vertical direction in the drawing and the magnetic disk 12 and fixing member 14 are formed into an integrated state. The fixing member 14 receives a driving force of a drive motor 13 of FIG. 2 and can rotate with the center of a circle of the magnetic disk 12 set as a rotation center in the plane of FIG. 1, and the magnetic disk 12 is also rotated together with rotation of the fixing member 14. In this case, a lubricant is coated on the upper surface (the surface shown in FIG. 1) of the magnetic disk 12.

As shown in FIG. 2, a head slider 15 is provided above the magnetic disk 12 in the housing 11 of the HDD 1 and the head slider 15 is supported by a carriage arm 17 via a suspension 16. The carriage arm 17 receives a driving force from a drive source 19 configured by a magnetic circuit and can be rotated with an arm shaft 18 shown in FIG. 1 set as a center. As shown in FIGS. 1 and 2, a strain sensor 21 that detects the strain magnitude of the suspension 16 is provided on the upper surface of the suspension 16 and the other end of an actuator 22 that is fixed at one end on a supporting member 22b and expands and contracts in a direction of a two-headed arrow C is attached to the undersurface of the suspension 16 as shown in FIG. 2. In this case, the supporting member 22b and drive source 19 are supported by a supporting table 19a.

In the HDD 1, the head slider 15 is moved to a portion near a desired storage area (track) on the rotating magnetic disk 12 by driving the carriage arm 17 by means of the drive source 19 at the time of recording information on the magnetic disk 12 and reproducing information from the magnetic disk 12. A contact-type head comprising a write element that records information on the magnetic disk 12 and a read element that reproduces information recorded on the magnetic disk 12 is mounted on the tip portion of the head slider 15 as will be described later and information recording and reproducing are performed while the head is kept in contact with a lubricant existing on the desired track.

Figure 3:
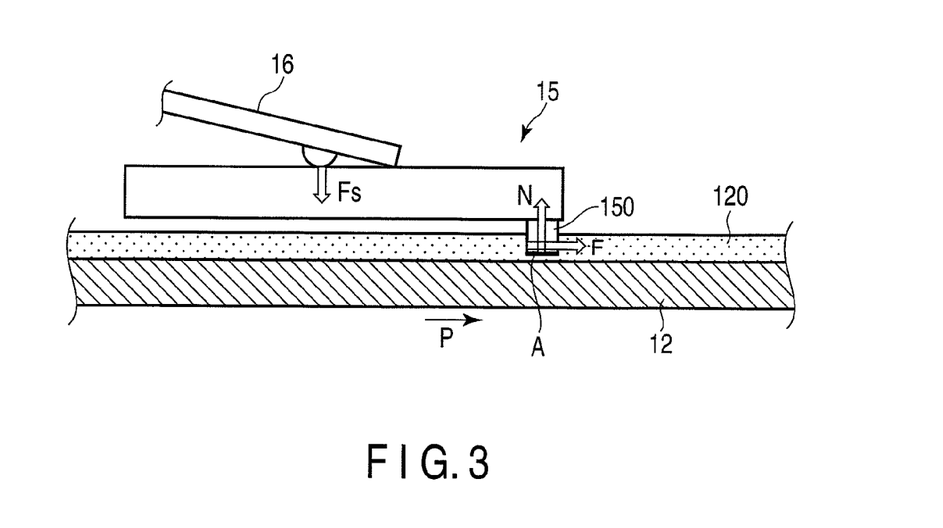
FIG. 3 is an exemplary schematic view showing a state in which a head makes contact with a lubricant at the information recording or reproduction time.

FIG. 3 is an exemplary schematic view showing a state in which the head makes contact with a lubricant at the information recording or reproduction time.

As shown in the drawing, in the HDD 1, information recording and reproducing are performed in a state in which a head 150 provided on the tip portion of the head slider 15 makes contact with a lubricant 120 on the magnetic disk 12 although it does not make direct contact with the magnetic disk 12. Specifically, the head 150 is sequentially set closer to respective 1-bit areas arranged on each track of the magnetic disk 12 by rotating the magnetic disk 12 in a direction of an arrow P. An electrical recording signal is input to the write element provided on the head 150 at the information recording time and the write element applies a magnetic field to each 1-bit area according to an input recording signal to record information carried by the recording signal in the form of a magnetization direction of each 1-bit area. Further, at the information reproduction time, the read element provided on the head 150 detects information recorded in the form of a magnetization direction of each 1-bit area by generating an electrical reproduction signal according to a magnetic field generated from each 1-bit area.

In the state shown in FIG. 3, since the head 150 does not make direct contact with the magnetic disk 12, the head 150 will not rub the magnetic disk 12 that is rotated in the direction of the arrow P in the drawing and the head 150 can smoothly slide while it is kept in contact with the lubricant 120. Therefore, in the HDD 1, wear of the head 150 is difficult to occur and stable recording/reproducing capability can be exhibited. Further, in this state, since the head 150 writes and reads information in a position that is as extremely close to the surface of the magnetic disk 12 as to cause the head to make contact with the lubricant 120 on the magnetic disk 12, a disk device that is suitable for an information storage medium with high recording density is attained.

The relationship established among the frictional force applied to the head, sliding speed of the head, area of the contact area of the head when the head makes contact with the lubricant and information storage medium and normal force applied to the contact area established in a head slider of a contact slider system that transfers information with respect to an information storage medium having a lubricant coated thereon is explained.

Figure 4:
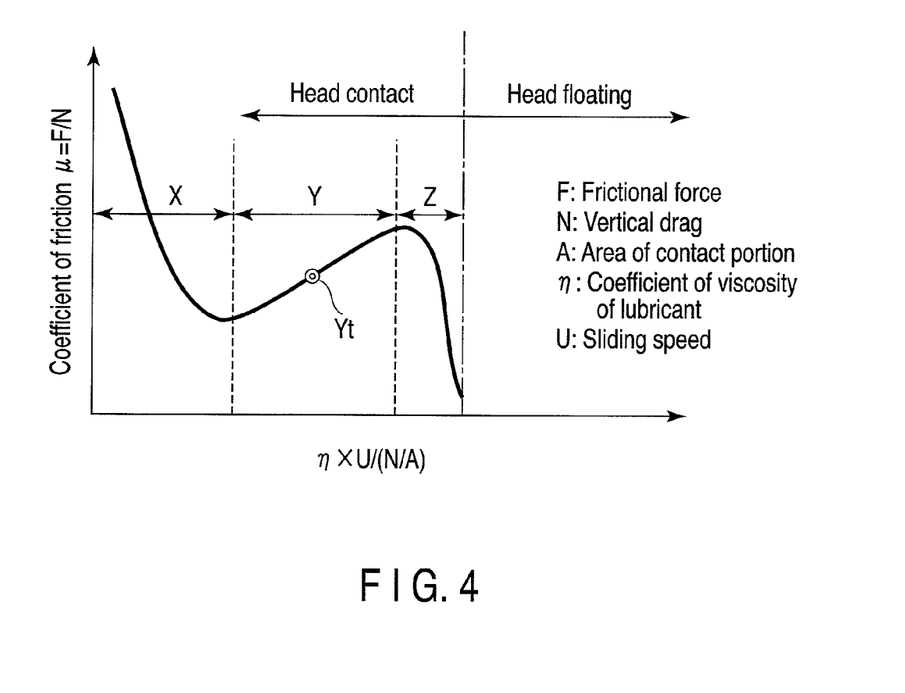
FIG. 4 is an exemplary diagram showing the relationship between the frictional force applied to the head, sliding speed of the head, area of a contact portion of the head and normal force applied to the head contact portion.

FIG. 4 is an exemplary diagram showing the relationship among the frictional force applied to the head, sliding speed of the head, area of the contact portion of the head and normal force applied to the head contact portion.

FIG. 4 shows a characteristic of a head slider using the contact slider system. A graph shows a qualitative variation in the coefficient of friction $\mu$ with respect to the coefficient of viscosity $\eta$, sliding speed U, normal force N and area A of the contact portion. The sliding speed when the head slides is represented by U, the coefficient of viscosity of the lubricant is represented by $\eta$, the area of the head contact portion is represented by A, the normal force applied to the head in the contact portion is represented by N, the frictional force applied to the head when the head slides is represented by F and the coefficient of friction obtained by dividing the frictional force F by the normal force N is represented by $\mu$. In this case, the frictional force F is a force that acts on the head to obstruct the head from sliding and is set in a direction opposite to the sliding direction of the head. In the frictional force F, not only solid contact frictional force (frictional force in a narrow sense) acting between two solid bodies but also force such as fluid resistance that obstructs the head from sliding is contained. The magnitude of the frictional force F is obtained by measurement by means of a measuring unit. For example, with the HDD 1 shown in FIGS. 1 and 2, it can be obtained by use of the strain magnitude of the suspension 16 measured by the strain sensor 21. Further, the normal force N is a force that can be adjusted by changing the pressing force that presses the head towards the information storage medium. For example, with the HDD 1, it can be adjusted by adjustment of the pressing force with which the carriage arm 17 presses the head 150 towards the magnetic disk 12 via the suspension 16. Further, area A of the head contact portion indicates the area of the head contact area when the head makes contact with the lubricant and information storage medium.

The graph of FIG. 4 is a graph obtained based on experimental results by checking a variation in the coefficient of friction $\mu$ when values of the coefficient of viscosity $\eta$, sliding speed U, normal force N and area A of the contact portion are varied and, in this example, the coefficient of friction $\mu$ is shown in the drawing as a function of a value $\eta \times U/(N/A)$. In the graph, it is indicated that the head is completely separated from the information storage medium and lubricant and made to float in the air in a state in which the value $\eta \times U/(N/A)$ lies on the right side with respect to a one-dot-dash line in FIG. 4. On the other hand, as shown in FIG. 4, three areas including an area Y in which the coefficient of friction $\mu$ monotonously increases with an increase in the value $\eta \times U/(N/A)$ and an area X and an area Z that lie on both sides of the above area Y and in which the coefficient of friction $\mu$ monotonously decrease in a state in which the head makes contact with the information storage medium and lubricant on the left side with respect to the one-dot-dash line. In the following description, the reason why the areas X, Y and Z in which the behaviors of the coefficient of friction $\mu$ are different appear is simply explained.

First, a case wherein the value $\eta \times U/(N/A)$ is increased by increasing the sliding speed U while the coefficient of viscosity $\eta$, normal force N and area A of the contact portion are kept constant is considered. A lubricant is difficult to enter between the head and the information storage medium when the head slides in a state in which the sliding speed U is set sufficiently low and the head pushes its way through the lubricant to make direct contact with the information storage medium. Therefore, contact friction occurs between the head and the information storage medium and the coefficient of friction $\mu$ becomes large. As shown in the left-side area X, since a lubricant enters between the head and the information storage medium when the sliding speed U increases, the coefficient of friction $\mu$ is reduced. The effect of reducing the coefficient of friction $\mu$ by thus entering the lubricant between the head and the information storage medium is maintained until the sliding speed U increases and the head is completely separated from the information storage medium.

On the other hand, as the sliding speed U increases, viscosity resistance received from the lubricant when the head slides increases. In this case, the viscosity resistance is a force that is approximately proportional to the sliding speed U and coefficient of viscosity $\eta$ and is set in a direction opposite to the sliding direction of the head. Therefore, if the sliding speed U further increases while the head is completely separated from the information storage medium and makes contact with only a lubricant, then the viscosity resistance increases and the coefficient of friction $\mu$ increases with an increase in the sliding speed U as shown in the central area Y. Therefore, a state in which the head does not make direct contact with the information storage medium but makes contact with the lubricant is realized in the central area Y. If the sliding speed U further increases, a force of air that acting on the head slider in a portion other than the head contact portion and acting to lift the head slider becomes larger and the head is intermittently separated from the lubricant by the lifting force. This state is an unstable state in which a state in which the head makes contact with the lubricant and a state in which the head is separated from the lubricant and floats in the air are alternately occur and a time during which it floats in the air becomes longer as the sliding speed U becomes higher. Therefore, as shown in the right-side area Z, the average coefficient of friction $\mu$ decreases as the sliding speed U increases.

Next, a case wherein the value $\eta \times U/(N/A)$ is increased by increasing the coefficient of viscosity $\eta$ while the sliding speed U, normal force N and area A of the contact portion are kept constant is considered. Since a lubricant whose coefficient of viscosity $\eta$ is sufficiently small has less fluidity, the head pushes its way through the lubricant to make direct contact with the information storage medium. Therefore, contact friction occurs between the head and the information storage medium and the coefficient of friction $\mu$ becomes large. Then, as shown in the left-side area X, since it becomes difficult for the head to push its way through the lubricant as the coefficient of viscosity $\eta$ is made larger, the coefficient of friction $\mu$ is reduced. If the coefficient of viscosity $\eta$ is further increased in a state in which the head is completely separated from the information storage medium and makes contact with only the lubricant, the viscosity resistance increases in the same way as described before and the coefficient of friction $\mu$ increases with an increase in the coefficient of viscosity $\eta$ as shown in the central area Y. Therefore, in the area Y, a state in which the head does not make direct contact with the information storage medium but makes contact with the lubricant is realized. In FIG. 4, the graph is illustrated as if the right-side area Z in which the coefficient of friction $\mu$ monotonously decreases is realized if the coefficient of viscosity $\eta$ is further increased while the sliding speed U, normal force N and area A of the contact portion are kept constant. However, in practice, the coefficient of friction $\mu$ will not be monotonously reduced again by increasing only the coefficient of viscosity $\eta$ as shown in the right-side area Z but the area Y in which it monotonously increases is enlarged.

Next, a case wherein the value $\eta \times U/(N/A)$ is increased by reducing the normal force N while the sliding speed U, coefficient of viscosity $\eta$ and area A of the contact portion are kept constant is considered. In a state in which the normal force N is sufficiently large, there occurs a state in which the pressing force that presses the head towards the information storage medium is large because of the balance of forces in a direction perpendicular to the information storage medium. Since the pressing force is large in this state, the head pushes its way through the lubricant to make direct contact with the information storage medium. Therefore, contact friction occurs between the head and the information storage medium and the coefficient of friction $\mu$ becomes large. As shown in the left-side area X, since it becomes difficult for the head to push its way through the lubricant if the pressing force is reduced to reduce the normal force N, the coefficient of friction $\mu$ is reduced. In this case, if the normal force N is reduced until a state in which the head does not make direct contact with the information storage medium and makes contact with only the lubricant is attained, the frictional force F is kept almost unchanged even if the normal force N is further reduced. Since the coefficient of friction $\mu$ is obtained by dividing the frictional force F by the normal force N as described before, the coefficient of friction $\mu$ increases as the normal force N is reduced as shown in the central area Y if the normal force N is further reduced from a state in which the head does not make direct contact with the information storage medium. Therefore, a state in which the head does not make direct contact with the information storage medium but makes contact with the lubricant is realized in the central area Y. Since the pressing force becomes excessively small if the normal force N is further reduced, the head is intermittently separated from the lubricant and made to float. In this state, a time period during which the head floats in the air becomes longer as the normal force N becomes smaller. Therefore, the average coefficient of friction p decreases with an increase in the sliding speed U as shown in the right-side area Z.

Finally, a case wherein the value $\eta \times U/(N/A)$ is increased by increasing the area A of the contact portion while the sliding speed U, coefficient of viscosity $\eta$ and normal force N are kept constant is considered. In a state in which the area A of the contact portion of the head is sufficiently small, a pressure applied to the contact portion of the head is large even if the pressing force is kept constant so that the head pushes its way through the lubricant to make direct contact with the information storage medium. Therefore, a contact friction occurs between the head and the information storage medium and the coefficient of friction $\mu$ becomes large. Then, as shown in the left-side area X, since it becomes difficult for the head to push its way through the lubricant as the area A of the contact portion is increased, the coefficient of friction $\mu$ is reduced. The effect of thus reducing the coefficient of friction $\mu$ is maintained until a state in which the area A of the contact portion is increased and the head is completely separated from the information storage medium and makes contact with only the lubricant is attained. On the other hand, in a state in which it makes contact with only the lubricant, conversely, the area that receives viscosity resistance is increased by enlarging the area A of the contact portion and the frictional force F between the lubricant and the head becomes larger.

Therefore, if the area A of the contact portion is further enlarged from the state in which the head does not make direct contact with the information storage medium, the coefficient of friction increases with an increase in the area A of the contact portion as shown in the central area Y. Therefore, a state in which the head does not make direct contact with the information storage medium but makes contact with the lubricant is realized in the area Y. In this case, in the drawing, the drawing is shown as if the right-side area Z in which the coefficient of friction μ monotonously decreases is realized if the area A of the contact portion is further increased while the sliding speed U, normal force N and coefficient of viscosity η are kept constant. However, in practice, the coefficient of friction μ will not be monotonously reduced again by increasing only the area A of the contact portion as shown in right-side area Z. The central area Y is merely enlarged.

With the HDD 1 shown in FIGS. 1 and 2, the normal force N can be changed by adjusting the pressing force that presses the head 150 towards the magnetic disk 12 while the sliding speed U, coefficient of viscosity η and area A (FIG. 3) of the contact portion of the head 150 are kept constant. The adjustment of the pressing force is performed by controlling the actuator 22 provided on the undersurface of the carriage arm 17 shown in FIG. 2 and the actuator 22 is driven to cause the value η×U/(N/A) to belong to an area in which the coefficient of friction μ monotonously increases with an increase in the value η×U/(N/A) as shown in the central area Y of FIG. 4. By driving the actuator 22, as shown in FIG. 3, a state in which the head 150 does not make direct contact with the magnetic disk 12 but makes contact with the lubricant 120 on the magnetic disk 12 is realized. Further, in the HDD 1, prior to realization of the state of FIG. 3, a process of deriving a monotonously increasing region (that is hereinafter simply referred to as a monotonously increasing region) is performed. In the following description, for realization of the state of FIG. 3, a control mechanism of the actuator 22 provided on the HDD 1 is explained.

Figure 5:
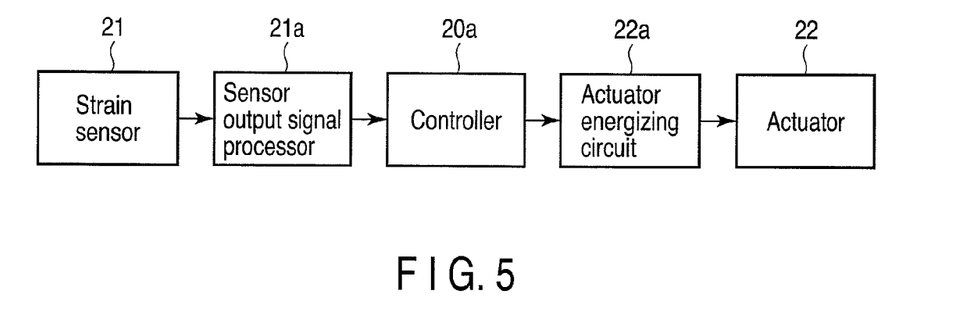
FIG. 5 is an exemplary schematic configuration diagram of a control mechanism of an actuator.

FIG. 5 is an exemplary schematic configuration diagram of an actuator control mechanism.

In the HDD 1 shown in FIGS. 1 and 2, the control mechanism of the actuator 22 with the configuration shown in FIG. 5 is provided. The actuator 22 is an actuator whose length contracts according to the magnitude of an applied voltage when the voltage is applied thereto and is driven in a direction of the two-headed arrow C shown in FIG. 2 by changing the magnitude of the applied voltage. In the control mechanism of the actuator 22 of FIG. 5, an actuator energizing circuit 22a that is an electronic circuit for applying a voltage to the actuator 22 is provided and the actuator energizing circuit 22a is controlled by a controller 20a. For example, if the controller 20a instructs the actuator energizing circuit 22a to apply a voltage to the actuator 22, the actuator 22 contracts to press the carriage arm 17 of FIG. 2 downwardly in FIG. 2 and the head 150 is pressed by the pressing towards the magnetic disk 12 via the suspension 16 as shown in FIG. 3. In FIG. 3, a pressing force of magnitude Fs is shown. The pressing force Fs balances the sum of the normal force N acting on the head 150 and set in the upward direction of FIG. 3 and a lifting force (not shown) by air applied to the head slider. Therefore, the controller 20a can adjust the normal force N acting on the head 150 via adjustment of the driving of the actuator 22.

Further, in the control mechanism of the actuator 22, the strain sensor 21 shown in FIGS. 1 and 2 described before is included and an electrical signal obtained from the strain sensor 21 and expressing the strain magnitude of the suspension 16 is input to a sensor output signal processor 21a and is then input to the controller 20a after it is subjected to a noise process and amplification process. In this case, the strain magnitude of the suspension 16 expresses the amount by which the suspension 16 is strained by the frictional force F (FIG. 3) applied thereto when the head 150 shown in FIG. 3 slides and the frictional force F balances the elastic force of the strained suspension 16 in the horizontal direction of FIG. 3. Therefore, the controller 20a detects the magnitude F of the frictional force applied when the head 150 slides according to a signal level (the magnitude of the current) of an input current signal.

In this case, the operation when the control mechanism of the actuator 22 derives a monotonously increasing region as shown in the central area Y of FIG. 4 is explained.

Figure 6:
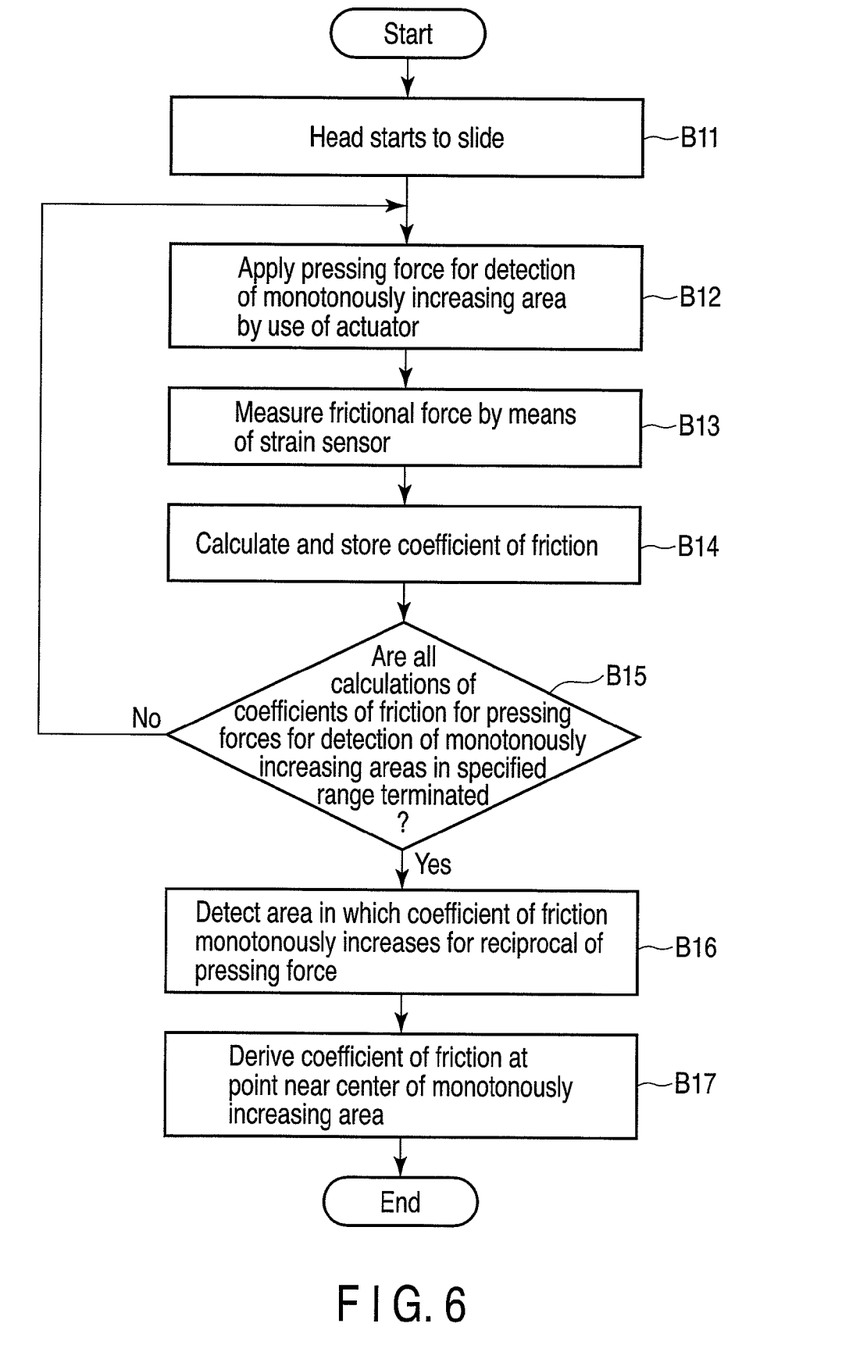
FIG. 6 is an exemplary flowchart for illustrating the operation performed when the control mechanism of the actuator shown in FIG. 5 derives a monotonously increasing region.

FIG. 6 is an exemplary flowchart for illustrating the operation performed when the control mechanism of the actuator shown in FIG. 5 derives a monotonously increasing region.

When the head 150 shown in FIG. 3 starts to slide (block B11), the controller 20a of FIG. 5 gives an instruction to the actuator energizing circuit 22a to apply a voltage to the actuator 22 and applies a pressing force for detection of a monotonously increasing region to the head 150 (block B12). In this case, the pressing force for detection of the monotonously increasing region is one of a plurality of pressing forces with different magnitudes that belong to a preset specified range and the minimum pressing force among the plural pressing forces is applied to the head 150 immediately after starting the operation for detecting a monotonously increasing region. In this case, the preset specified range corresponds to a range (detection range) in which the value η×U/(N/A) for detection of a monotonously increasing region changes. Then, under the pressing force, the strain magnitude (corresponding to the frictional force) is measured by means of the strain sensor 21 of FIG. 5 (block B13). The controller 20a derives the coefficient of friction by dividing the frictional force obtained from the measurement result of the strain sensor 21 by the pressing force applied to the head 150 at this point in time and the value is set to correspond to the pressing force and stored in a memory (not shown) in the controller 20a (block B14). Then, the operation of blocks B12 to B14 is repeatedly performed for the second minimum pressing force among the above plural pressing forces (No in block B15). Further, the same process is performed for all of the plural pressing forces while increasing the pressing force, and when calculations of coefficients of friction for all of the plural pressing forces in the above specified range are terminated (Yes in block B15), the controller 20a derives an area in which the coefficient of friction monotonously increases with an increase in the reciprocal of the pressing force (that is, with a decrease in the pressing force) based on the coefficients of friction stored in the memory and set to correspond to the plural pressing forces (block B16). Then, the controller 20a derives the pressing force and the coefficient of friction at a point that exists near the center of the determined monotonously increasing region as shown by a point Yt in the central area Y of FIG. 4 (block B17). Specifically, the controller 20a derives average values of the pressing forces and average values of the coefficients of friction for all of the pressing forces belonging to the monotonously increasing region and the coefficients of friction corresponding to the respective pressing forces among the plural pressing forces and coefficients of friction. In this case, the process of FIG. 6 explained above corresponds to one example of the contents of an operation performed in the initialization mode used in this embodiment.

Next, in order to realize the state of the point near the center of the determined monotonously increasing region in block B17, the operation performed by the control mechanism of the actuator 22 shown in FIG. 5 is explained.

The controller 20a gives an instruction to the actuator energizing circuit 22a to apply a voltage to the actuator 22 and applies a pressing force to the head 150 to attain the coefficient of friction determined in block B17 of FIG. 6. As a result, the state of the point near the center of the monotonously increasing region determined in block B17 is realized and information recording and information reproduction are performed in this state. In this case, the process after all of the processes of FIG. 6 are terminated until the state of the point is realized corresponds to one example of the operation content performed in the access mode used in this embodiment.

As is explained by use of FIGS. 5 and 6, the process of deriving the monotonously increasing region and realizing the state of the point near the center of the monotonously increasing region is performed at the power-on time of the HDD 1 of FIGS. 1 and 2 or for each preset time interval and information recording and information reproduction are performed in the newly updated state. Therefore, in the HDD 1, even if the contact state between the head 150 of FIG. 3 and the magnetic disk 12 or lubricant 120 is changed due to the environment or a variation with time, the state of FIG. 3 is maintained at the information recording or reproduction time and stable recording/reproducing capability is exhibited.

In the HDD 1 explained above, a monotonously increasing region is determined by adjusting the pressing force and changing the normal force while the sliding speed, coefficient of viscosity and the area of the contact portion of the head 150 are kept constant. However, it is possible to derive a monotonously increasing region by adjusting the area of the contact portion of the head while the sliding speed, coefficient of viscosity and normal force are kept constant.

Next, a second embodiment of the disk device using a system of deriving a monotonously increasing region by adjusting the area of the contact portion is explained.

The disk device of the second embodiment adjusts the area of the head contact portion is also a hard disk drive (HDD). This HDD of the second embodiment is different from the HDD 1 shown in FIGS. 1 and 2 in that the actuator 22 of FIG. 2 that adjusts the pressing force is not provided, a mechanism that adjusts the area of the head contact portion is provided instead thereof on the head and a monotonously increasing region is determined by adjusting the area of the head contact portion. The other portions of the HDD of the second embodiment have the same configuration as those of the HDD 1 shown in FIGS. 1 and 2. Therefore, the drawings of the HDD of the second embodiment that adjusts the area of the head contact portion as viewed from above and as viewed from the side are explained with reference to FIGS. 1 and 2 and the repetitive explanation thereof is omitted here. In the following description, portions different from the HDD 1 shown in FIGS. 1 and 2 are concentratedly explained.

Figure 7:
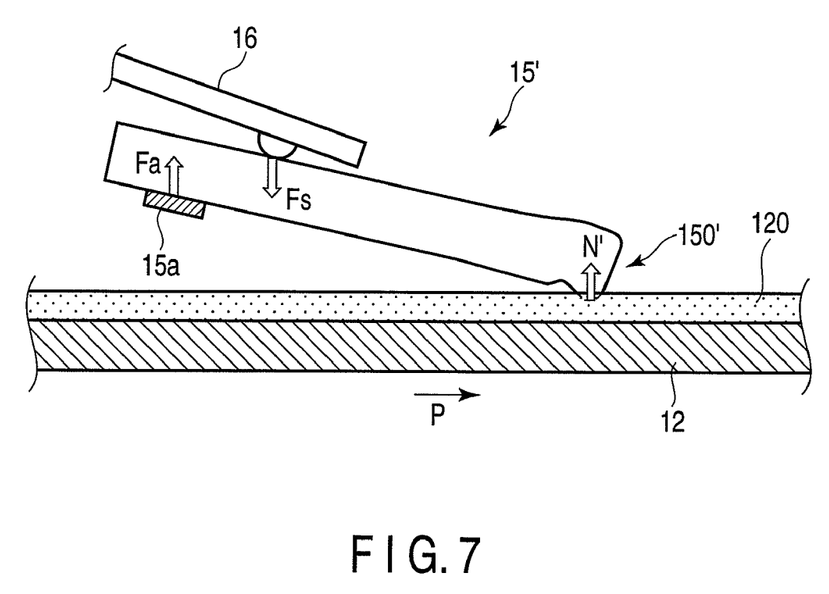
FIG. 7 is an exemplary view showing a state in which the tip portion of a head slider makes contact with a lubricant on a magnetic disk to record information and reproduce information.

FIG. 7 is an exemplary view showing a state in which the tip portion of a head slider makes contact with a lubricant on a magnetic disk to record information and reproduce information.

In this drawing, constituents that are the same as the constituents of FIG. 3 are denoted by the same reference numerals or symbols and the repetitive explanation thereof is omitted. A head slider 15' is supported by the suspension 16 that extends in a direction diagonally up to the left in the drawing and the tip portion facing in the right direction in the drawing makes contact with the lubricant 120 on the magnetic disk 12 that rotates in a direction of an arrow P in the drawing at the information recording and information reproducing time as shown in the drawing. The tip portion is a head 150' of the head slider 15' and the head 150' receives upward normal force N'. Further, a lifting force acquisition portion 15a receiving a lifting force that acts to lift the head slider 15 in an upward direction (in a direction apart from the magnetic disk 12) in the drawing by the flow of air caused by rotation of the magnetic disk 12 is provided on a portion of the surface of the head slider 15' that faces the magnetic disk 12 and the head slider 15 receives upward lifting force with the magnitude of Fa on the lifting force acquisition portion 15a. The sum of the normal force N' and lifting force Fa balances the pressing force Fs acting on the head slider 15'. In the head slider 15', the normal force N', lifting force Fa and pressing force Fs are kept substantially constant and are kept almost unchanged even if the contact state of the head 150' is changed.

The same write element and read element as those provided in the head 150 of FIG. 3 are provided in the head 150' of FIG. 7 and a thermal actuator that thermally expands towards the magnetic disk 12 when supplied with heat is also provided alongside of the write element and read element. By thermal expansion of the thermal actuator, contact between the head slider 15' and lubricant 120 is realized.

Figure 8A:
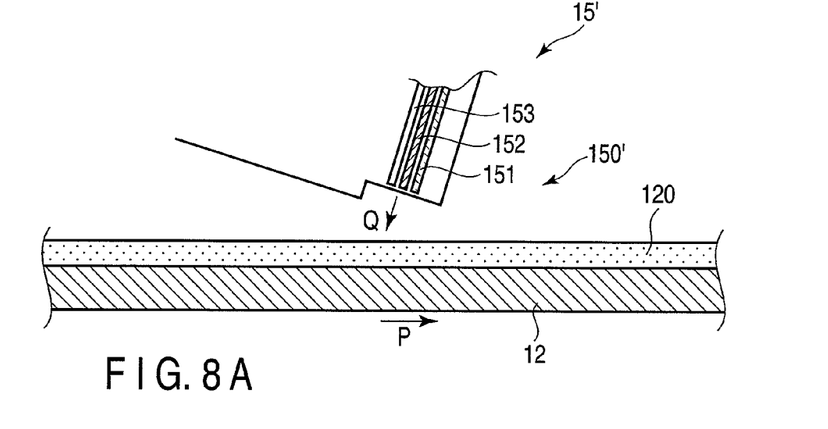
FIGS. 8A, 8B, and 8C are exemplary views showing the shape of the head that varies with thermal expansion of a thermal actuator.
Figure 8B:
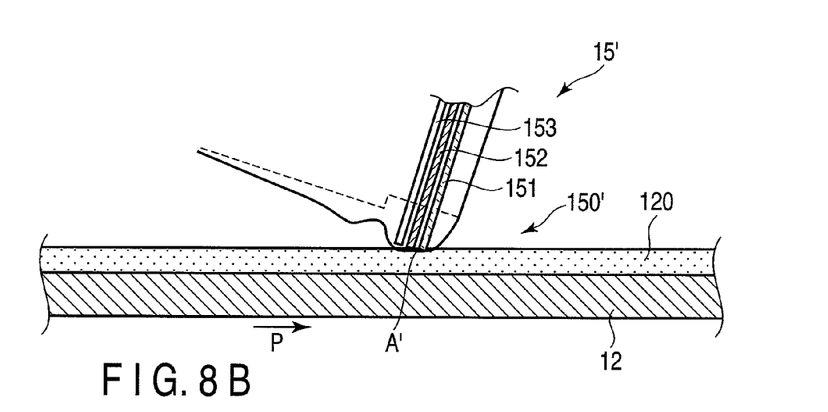
Figure 8C:
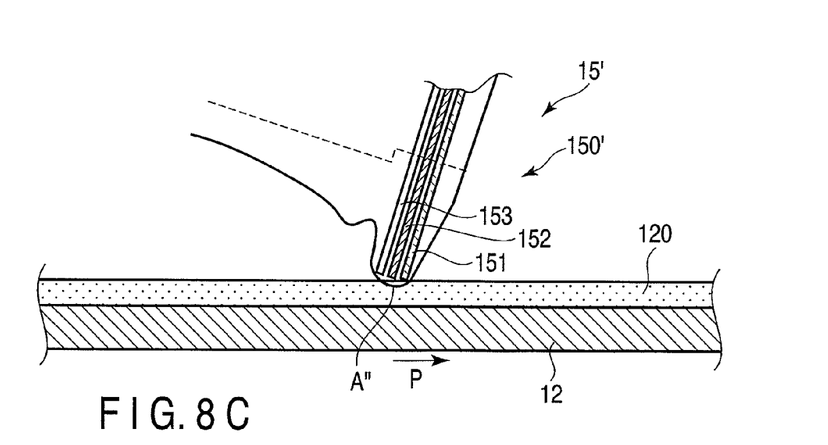

FIGS. 8A, 8B and 8C are exemplary views showing the shape of the head that varies with thermal expansion of the thermal actuator.

A thermal actuator 152 is provided between a write element 151 and read element 153. The thermal actuator 152 is an actuator that thermally expands according to an amount of supplied heat and a state in which no heat is supplied to the thermal actuator 152 and the thermal actuator does not thermally expand is shown in FIG. 8A. When heat is supplied to the thermal actuator 152 in the state of FIG. 8A, the thermal actuator 152 thermally expands in a direction of an arrow Q in the drawing and the write element 151 and read element 153 also move in the direction of the arrow Q in the drawing with the thermal expansion. If heat of a preset amount or more is supplied to the thermal actuator 152, a portion that projects downwardly in the drawing comes in contact with the lubricant 120 on the magnetic disk 12 as shown in FIG. 8B. If an amount of heat is further supplied to the thermal actuator 152 in a state shown in FIG. 8B, the projecting portion comes to have a shape that sharply projects downwardly as shown in FIG. 8C and an area A" of the contact portion (the surface facing the magnetic disk 12) of the head 150' in FIG. 8C becomes smaller than an area A' of the contact portion (the surface facing the magnetic disk 12) of the head 150' in FIG. 8B.

In this case, information recording and information reproduction are performed in the state in which the head 150' does not make direct contact with the magnetic disk 12 but makes contact with the lubricant 120 on the magnetic disk 12 as shown in FIGS. 8B and 8C in the HDD of this embodiment. The operation of the write element 151 and read element 153 at the information recording and reproducing time is the same as that described in FIG. 3 and the explanation thereof is omitted here.

In the HDD of this embodiment, a mechanism that controls the thermal actuator 152 is provided and the configuration of the control mechanism is obtained by replacing the actuator 22 in the configuration of the control mechanism in FIG. 5 by the thermal actuator 152 and replacing the actuator energizing circuit 22a of FIG. 5 by a thermal actuator energizing circuit that supplies heat to the thermal actuator 152. The thermal actuator energizing circuit includes a heating wire that generates heat when a current flows therein and heat of an amount corresponding to the magnitude of the current is supplied to the thermal actuator 152 by passing the current through the heating wire.

The remaining constituents other than the thermal actuator 152 and actuator energizing circuit are the same as the constituents of FIG. 5 and the repetitive explanation thereof is omitted here. A monotonously increasing region such as the central area Y of FIG. 4 is determined by the control mechanism of the thermal actuator 152.

Figure 9:
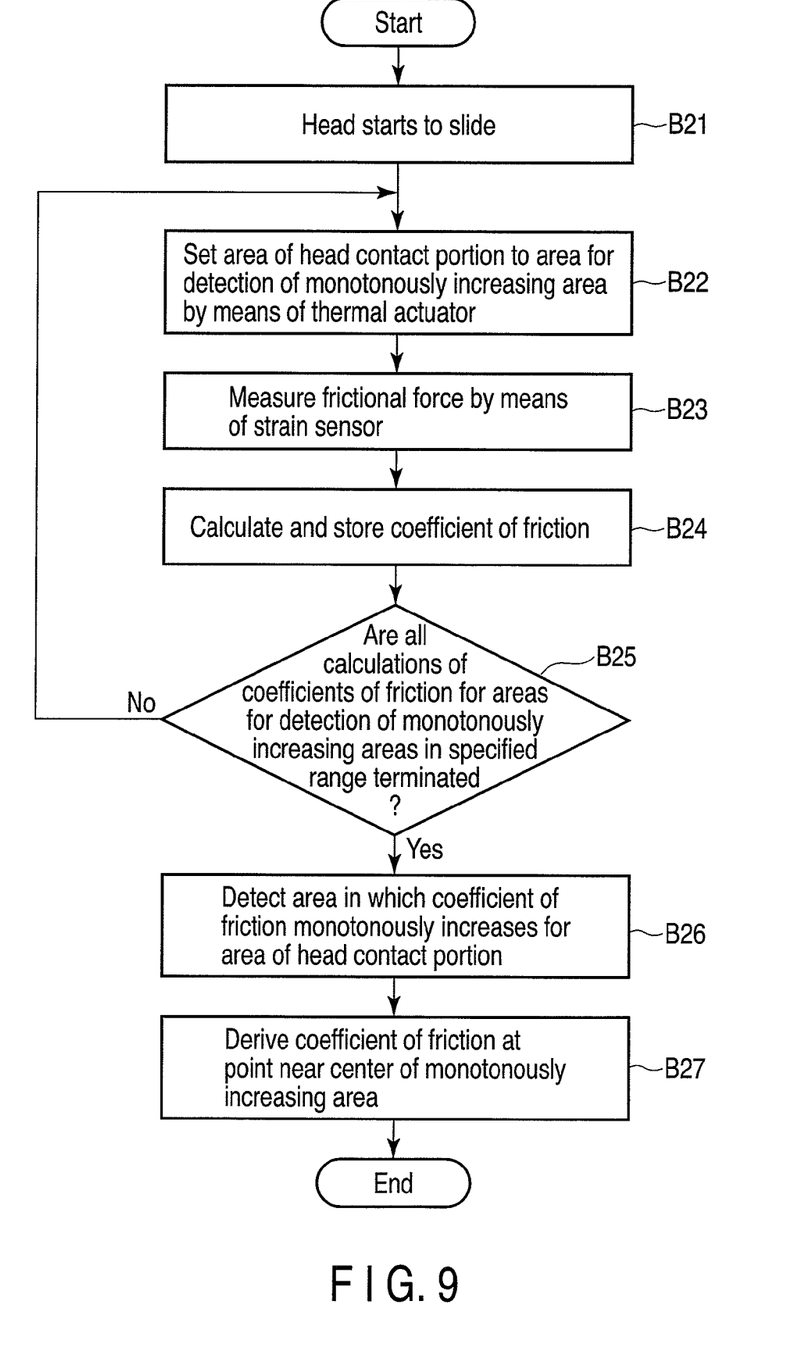
FIG. 9 is an exemplary flowchart for illustrating the operation performed when a control mechanism of the thermal actuator derives a monotonously increasing region.

FIG. 9 is an exemplary flowchart for illustrating the operation performed when the control mechanism of the thermal actuator derives a monotonously increasing region.

When the head 150' shown in FIG. 7 starts to slide and run (block B21), a controller (that is the same as the controller 20a of FIG. 5) provided on the control mechanism of the thermal actuator 152 gives an instruction to the actuator energizing circuit to thermally expand the thermal actuator 152 and set the area of the contact portion of the head 150' to the area for detection of a monotonously increasing region (block B22). In this case, the area for detection of the monotonously increasing region is one of a plurality of areas with different sizes that belong to a preset specified range and the thermal actuator 152 is thermally expanded to set the area of the contact portion of the head 150' to the largest area among the plural areas immediately after starting the operation for deriving a monotonously increasing region. In this case, the preset specified range corresponds to a range (detection range) in which the value η×U/(N/A) for detection of a monotonously increasing region moves. Then, under the state in which the area of the contact portion of the head is set to the above area, the strain magnitude (corresponding to the frictional force) is measured by means of a strain sensor (that is the same as the strain sensor 21 of FIG. 5) (block B23). The controller derives the coefficient of friction by dividing the frictional force obtained from the measurement result of the strain sensor 21 by the pressing force (pressing force of a preset value in this embodiment) applied to the head 150' and the value is set to correspond to the area of the contact portion of the head 150' at this point in time and stored in a memory of the controller (block B24). Then, the operation of blocks B22 to B24 is repeatedly performed for the second largest area among the above plural areas (No in block B25). Further, the same process is performed for all of the plural areas while decreasing the area, and when calculations of coefficients of friction for all of the plural areas in the above specified range are terminated (Yes in block B25), the controller derives an area in which the coefficient of friction monotonously increases with an increase in the area based on the coefficients of friction recorded in the memory and set to correspond to the plural areas (block B26). Then, the controller derives the area of the contact portion of the head 150' and the coefficient of friction at a point that exists near the center of the determined monotonously increasing region as shown by a point Yt in the central area Y of FIG. 4. Specifically, the controller derives an average value of the areas and an average value of the coefficients of friction for all of the areas belonging to the monotonously increasing region and the coefficients of friction corresponding to the respective areas among the plural areas and coefficients of friction. Then, the frictional force at the above point is determined by multiplying the determined coefficient of friction by the pressing force (block B27). The frictional force becomes the target frictional force set as a control target at the time of feedback control. In this case, the process of FIG. 9 explained above corresponds to one example of the operation content performed in the initialization mode used in the embodiment.

Next, in order to realize the state of the point near the center of the determined monotonously increasing region in block B27, the operation performed by the control mechanism of the thermal actuator 152 is explained.

The controller gives an instruction to the thermal actuator energizing circuit to apply a current to the thermal actuator 152 and sets the area of the contact portion of the head 150' to attain the frictional force determined in block B27 of FIG. 9. As a result, the state of the point near the center of the monotonously increasing region determined in block B27 is realized and information recording and reproduction are performed in this state.

The process for deriving the monotonously increasing region and realizing the state of the point near the center of the monotonously increasing region as described above is performed at the power-on time of the HDD or for each preset time interval so that information recording and information reproduction are performed in a newly updated state. Therefore, in the HDD, even if the contact state between the head 150' of FIG. 3 and the magnetic disk 12 or lubricant 120 is changed due to the environment or a variation with time, the state of FIG. 7 is maintained at the information recording or reproduction time and stable recording/reproducing capability is exhibited.

Figure 10:
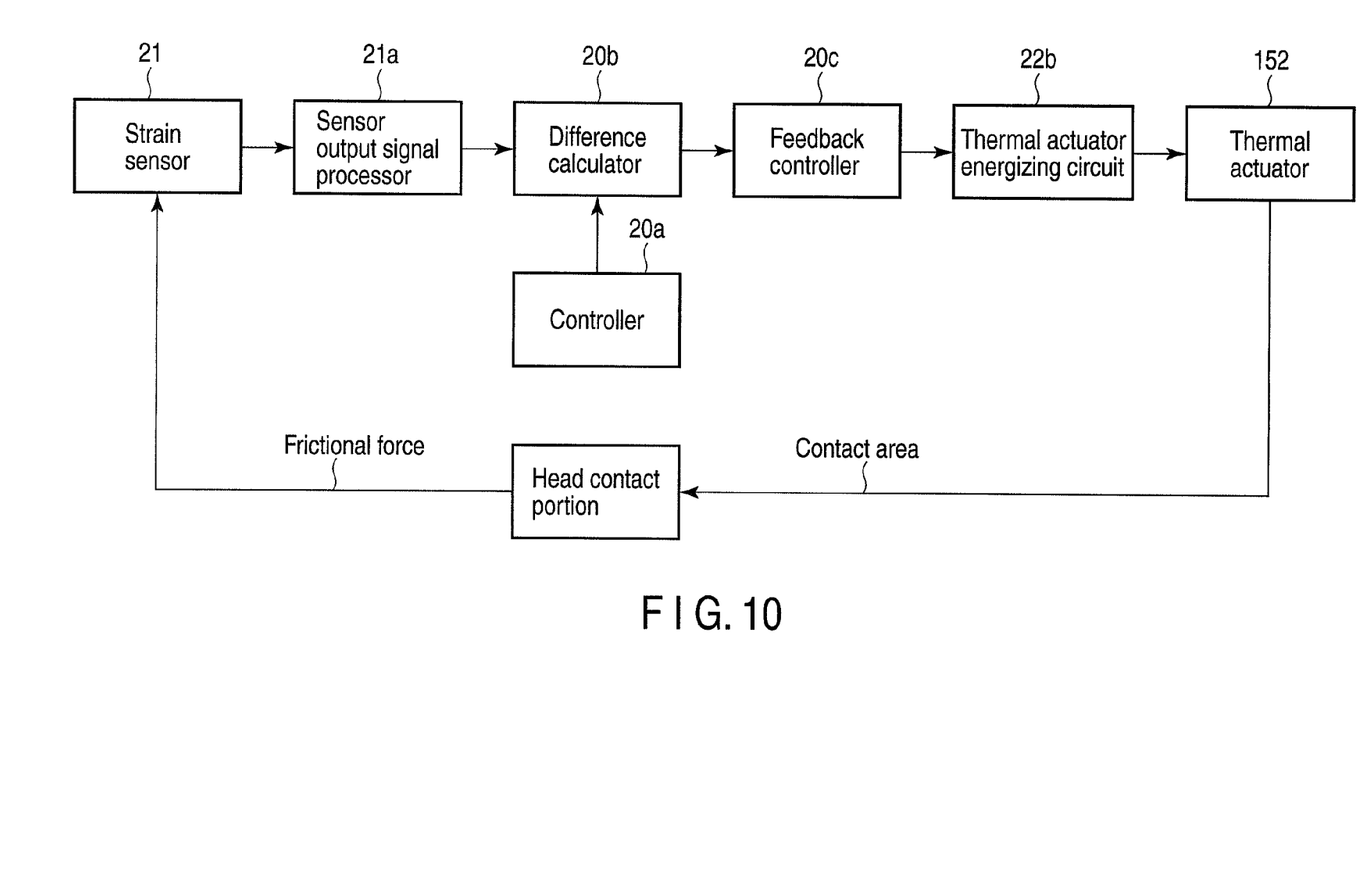
FIG. 10 is an exemplary schematic configuration diagram of a feedback control mechanism of the thermal actuator.

Further, when the target frictional force is determined in the control mechanism of the thermal actuator 152, feedback control for always realizing the state of the point near the center of the monotonously increasing region can be performed. The configuration of the control mechanism is shown in FIG. 10. In the control mechanism, a difference calculator 20b and feedback controller 20c are provided and they are used when the magnitude of a current applied to the thermal actuator 152 is adjusted to set a strain magnitude (corresponding to the frictional force F) detected by the strain sensor 21 to a desired strain magnitude as will be described later.

The remaining constituents other than the thermal actuator 152 and thermal actuator energizing circuit 22b, difference calculator 20b, and feedback controller 20c are the same as the constituents of FIG. 5 and the repetitive explanation thereof is omitted here. The above feedback control can be performed by means of the control mechanism of the thermal actuator 152.

That is, first, the controller 20a outputs the magnitude of the frictional force at a point near the center of the monotonously increasing region determined in block B27 of FIG. 9 to the difference calculator 20b as a target frictional force. Then, the difference calculator 20b calculates the difference between the signal level of the current signal expressing the measured magnitude of the frictional force and the signal level of the current signal expressing the target frictional force and outputs the difference value to the feedback controller 20c and the feedback controller 20c determines the degree by which a current passed through the heating wire is increased or decreased to thermally expand the thermal actuator 152 based on the difference value and outputs the increase/decrease value to the thermal actuator energizing circuit 22b. Then, the thermal actuator energizing circuit 22b increases or decreases a current passed through the heating wire according to the input increase/decrease value. The above process is repeatedly performed to always control the frictional force to the target frictional force. As a result, the state of the point near the center of the monotonously increasing region determined in block B27 is always realized and information recording and information reproduction are performed in this state.

As a result, in the HDD of this embodiment, even if the contact state between the head 150' of FIG. 7 and the magnetic disk 12 or lubricant 120 is changed in a circumferential position on the magnetic disk or changed according to an environmental variation in a short period, the state of FIG. 7 is maintained at the information recording or reproduction time and stable recording/reproducing capability is exhibited. In this case, a process to realization of the above state of the point after termination of the entire process of FIG. 9 corresponds to one example of the operation content performed in the access mode of the embodiment.

According to the embodiments, a disk device rotates a disk information storage medium to access the information storage medium by use of a head that slides in contact with a lubricant coated on the information storage medium, wherein a sliding speed U, area A and normal force N are set to cause U×A/N to belong to a monotonously increasing region in which a coefficient of friction associated with a frictional force occurring in a contact area of the head that faces the information storage medium monotonously increases as U×A/N increases, the sliding speed U represents a sliding speed at a sliding time of the head, the area A represents the contact area of the head, and the normal force N represents a normal force applied to the contact area of the head.

The term "access" may indicate both of recording of information on the information storage medium and reproduction of information from the information storage medium or, for example, may indicate one of recording and reproduction in a read-only disk device or the like. Further, the term "coefficient of friction" may indicate a numeral value obtained by dividing "frictional force" by the normal force and "frictional force" may indicate a force acting on the head in a direction opposite to the sliding direction of the head to obstruct the head from sliding. The term "frictional force" may not only be contact frictional force (frictional force in a narrow sense) acting between two solid bodies but also be a force such as a fluid resistance that obstructs the head from sliding.

In the monotonously increasing region in which the coefficient of friction between the head and the information storage medium monotonously increases as U×A/N increases, a state in which the head slides without making direct contact with the information storage medium although it makes contact with a lubricant is realized. Since the head accesses the information storage medium in the above state, the head does not directly rub the information storage medium and is difficult to wear away. Therefore, stable recording/reproducing capability can be exhibited. Further, since the head accesses the information storage medium in a position that is as extremely close to the surface of the information storage medium as to permit the head to make contact with the lubricant on the information storage medium, the disk device has high capability of writing and reading data and is suitable for the information storage medium with high recording density.

If the disk device further includes a pressing module configured to press the head towards the information storage medium with a variable pressing force, and the controller is configured to cause the pressing module to adjust the pressing force to maintain U×A/N within a monotonously increasing region for the coefficient of friction, the above state is realized by use of a simple method of adjusting the pressing force.

If the disk device further includes a sensor configured to measure the frictional force occurring in the contact area of the head, and the controller is configured to cause the pressing module to adjust the pressing force to maintain U×A/N within the monotonously increasing region for the coefficient of friction according to the frictional force measured by the sensor, the above state is maintained even if the magnitude of frictional force acting on the head is varied according to an environment or a variation with time.

If the disk device further includes an area adjusting module configured to enlarge or reduce the contact area to adjust the area of the contact area, and the controller is configured to cause the area adjusting module to adjust the area to maintain U×A/N within a monotonously increasing region for the coefficient of friction, the above state in which the head slides without making direct contact with the information storage medium although it makes contact with a lubricant can be realized by a simple method of area adjustment.

According to the embodiments, a second disk device rotates a disk information storage medium to access the information storage medium by use of a head that slides in contact with a lubricant coated on the information storage medium, the device includes:

a pressing module configured to press the head towards the information storage medium with a variable pressing force;

a sensor configured to measure the frictional force occurring in a contact area of the head; and a controller having an initialization mode in which a monotonously increasing region in which a coefficient of friction monotonously increases with an increase in a reciprocal of the pressing force is determined by causing the pressing module to press the head towards the information storage medium while the pressing force is being varied and monitoring the frictional force measured by the sensor for a pressing time and an access mode in which the pressing module is caused to adjust the pressing force to maintain the pressing force within the monotonously increasing region determined in the initialization mode.

In the second disk device, an area in which a state is realized in which the head slides without making direct contact with the information storage medium although it makes contact with a lubricant is determined in the initialization mode, and additionally, the pressing force is adjusted to realize and maintain the state in the access mode. As a result, the second disk device exhibits stable recording/reproducing capability and is suitable for an information storage medium with high recording density.

If the controller is configured to derive the monotonously increasing region and to set a magnitude of the pressing force in a preset position in the monotonously increasing region determined as a control target value in the initialization mode, to cause the pressing module to adjust the pressing force to make the pressing force equal to the control target value in the access mode, and is periodically perform an updating process of the control target value and an adjusting process of the pressing force corresponding to an updated control target value by periodically performing the initialization mode and the access mode, the recording/reproducing capability is enhanced. The term "the magnitude of the pressing force in a preset position in the monotonously increasing region" may be the magnitude of the pressing force that is determined for each determined monotonously increasing region and whose reciprocal belongs to the monotonously increasing region. For example, the magnitude of the pressing force that internally divides the monotonously increasing region with a preset internally dividing ratio or the magnitude of the pressing force obtained by increasing the minimum value (a boundary value on the smaller side) of the reciprocal of the pressing force in the monotonously increasing region by a preset value as a reciprocal is an example of "the value of the pressing force in the preset position in the monotonously increasing region". Further, the term "updating of the control target value" may means resetting of the control target value and may resultantly contain a case of resetting the value to a control target value of the same value.

According to the embodiments, a third disk device rotates a disk information storage medium to access the information storage medium by use of a head that slides in contact with a lubricant coated on the information storage medium, the device includes:

an area adjusting module configured to enlarge or reduce a contact area of the head that faces the information storage medium to adjust the area of the contact area;

a sensor configured to measure the frictional force occurring in the contact area of the head; and a controller having an initialization mode in which a monotonously increasing region in which a coefficient of friction monotonously increases with an increase in the area of the contact area is determined by monitoring the frictional force measured by the sensor while adjusting the area of the contact area and an access mode in which the area adjusting module is caused to adjust the area of the contact area to maintain the area of the contact area within the monotonously increasing region determined in the initialization mode.

In the third disk device, an area in which a state is realized in which the head slides without making direct contact with the information storage medium although it makes contact with a lubricant is determined in the initialization mode, and additionally, the area of the contact area is adjusted to realize and maintain the state in the access mode. As a result, the third disk device exhibits stable recording/reproducing capability and is suitable for an information storage medium with high recording density.

If the controller is configured to derive the monotonously increasing region and to set a magnitude of the pressing force in a preset position in the monotonously increasing region determined as a control target value in the initialization mode, to cause the area adjusting module to adjust the area of the contact area to make the area of the contact area equal to the control target value in the access mode, and is periodically perform an updating process of the control target value and an adjusting process of the area of the contact area corresponding to an updated control target value by periodically performing the initialization mode and the access mode, the recording/reproducing capability is enhanced. The term "the magnitude of the contact area existing in a preset position in the monotonously increasing region" may be the magnitude of a contact area belonging to the monotonously increasing region and determined for each determined monotonously increasing region. For example, the magnitude of an area that internally divides the monotonously increasing region with a preset internally dividing ratio or the magnitude of an area obtained by increasing the minimum value (a boundary value on the smaller side) of an area in the monotonously increasing region by a preset value is a concrete example of "the magnitude of the contact area existing in a preset position in the monotonously increasing region". Further, the term "updating of the control target value" may means resetting of the control target value and may resultantly contain a case of resetting the value to a control target value of the same value.

If the controller is configured to derive the monotonously increasing region and to set a magnitude of the pressing force in a preset position in the monotonously increasing region determined as a control target value in the initialization mode, and to cause the area adjusting module to adjust the area of the contact area to make the area of the contact area equal to the control target value by means of a feedback control in the access mode, a state in which the value of the area of the contact area coincides with the control target value is easily realized.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

In the above embodiments, it is explained that the head 150' is separated from the lubricant 120 when no heat is supplied to the thermal actuator 152 and the thermal actuator does not thermally expand in the head slider as shown in FIG. 8A. However, the head 150' may make contact with the lubricant 120 even when the thermal actuator does not thermally expand.

Further, in the embodiments explained above, the actuator that contracts in response to voltage application and the actuator that thermally expands are used, but this invention can use any type of a device that can adjust the pressing force or the area of the head contact portion.

What is claimed is:

1. A disk device comprising:
   a disk information storage medium, wherein the disk device is configured to rotate the disk information storage medium in order to record and reproduce information on the information storage medium using a head configured to slide in contact with a lubricant coating on the information storage medium, and wherein a combination of a sliding speed U, a contact area of the head A and a normal force applied to the contact area of the head N is configured to satisfy that U×A/N is within a monotonously increasing region where a coefficient of friction associated with a frictional force in a contact area of the head facing the information storage medium monotonously increases as U×A/N increases;
   a pressing module configured to press the head towards the information storage medium with a variable pressing force; and
   a controller configured to cause the pressing module to adjust the pressing force to maintain U×A/N within the monotonously increasing region for the coefficient of friction.

2. The disk device of claim 1, further comprising:
   a sensor configured to measure the frictional force in the contact area of the head, wherein
   the controller is configured to cause the pressing module to adjust the pressing force to maintain U×A/N within the monotonously increasing region for the coefficient of friction in response to the frictional force measured by the sensor.

3. A disk device configured to rotate a disk information storage medium in order to access the information on the information storage medium with a head configured to slide in contact with a lubricant coating on the information storage medium, the device comprising:
   a pressing module configured to press the head towards the information storage medium with a variable pressing force;
   a sensor configured to measure the frictional force in a contact area of the head; and
   a controller comprising an initialization mode where the controller is configured to determine a monotonously increasing region where a coefficient of friction monotonously increases in inversely proportion to the pressing force by causing the pressing module to press the head towards the information storage medium while the pressing force is being varied and monitoring the frictional force measured by the sensor while the pressing force is being varied, and an access mode where the pressing module is caused to adjust the pressing force to maintain the pressing force within the monotonously increasing region determined in the initialization mode.

4. The disk device of claim 3, wherein the controller is configured to compute the monotonously increasing region and to set a target magnitude of the pressing force at a predetermined position in the monotonously increasing region in the initialization mode, to cause the pressing module to adjust the pressing force substantially to the target magnitude in the access mode, and to periodically update the target magnitude and to adjust the pressing force corresponding to the updated target magnitude by periodically alternating the initialization mode and the access mode.

* * * * *